(No Model.)
R. GODFREY.
CORN CUTTER.
No. 360,219. Patented Mar. 29, 1887.
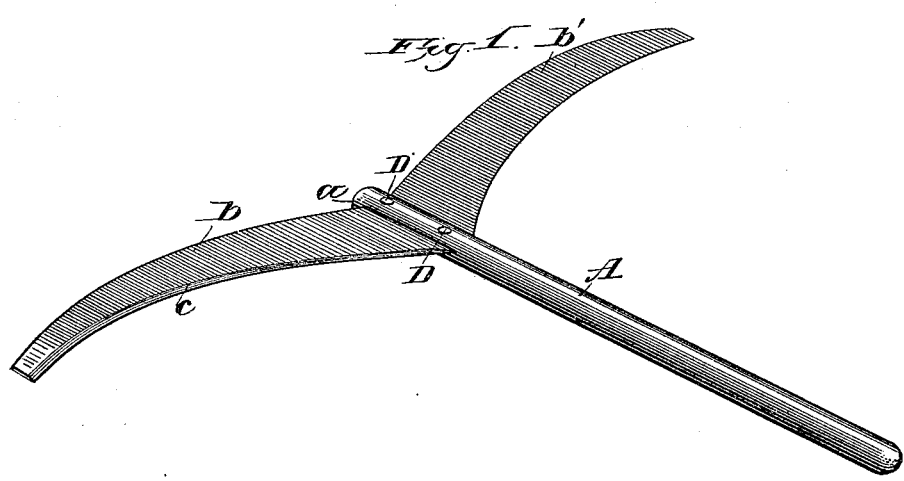
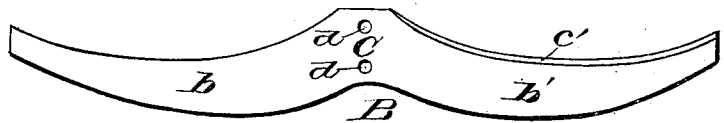
Witnesses:
E. G. Asmus
N. E. Oliphant
Inventor:
Robert Godfrey
By Stout & Underwood
Attorneys

UNITED STATES PATENT OFFICE.

ROBERT GODFREY, OF WALWORTH, WISCONSIN.

CORN-CUTTER.

SPECIFICATION forming part of Letters Patent No. 360,219, dated March 29, 1887.

Application filed March 5, 1886. Serial No. 194,180. (No model.)

*To all whom it may concern:*

Be it known that I, ROBERT GODFREY, of Walworth, in the county of Walworth, and in the State of Wisconsin, have invented certain new and useful Improvements in Corn-Cutters; and I do hereby declare that the following is a full, clear, and exact description thereof.

My invention relates to devices for cutting cornstalks, &c., while standing in the field; and it consists in certain peculiarities of construction, as will be fully set forth hereinafter.

In the drawings, Figure 1 is a perspective view of my improved device. Fig. 2 is a plan view of the blade thereof detached from the handle, and showing the opposite side thereof from that shown in Fig. 1. Fig. 3 is a perspective view of the handle detached.

Heretofore corn-cutters have been commonly constructed with a single cutting blade, similar in general appearance to one-half of my blade, although usually flaring out more than either half of my blade does. The defect with this ordinary form of device is the tendency of the point of the blade to drop downward, thereby causing the handle to turn in the hand and chafe it, or, if held sufficiently tight to obviate this, then to cause an undue strain on the hand and wrist, and thereby to divert a portion of the strength and force of the user to the task of keeping the blade from twisting or turning down at the point, instead of allowing all the said strength and energy to be used in the process of cutting the stalks, &c., without chafing the hand or tiring the wrist.

A is the handle of my device, made of wood, and provided at one end with a central longitudinal slot, *a*, to receive the blade.

B is the blade, formed double or with two cutting parts, *b b'*, exactly alike, but extending from a common center, C, in opposite directions, and each part of the blade is beveled, as shown at *c c'*, respectively, so that only one beveled surface is uppermost at a time, and so that when the tool is taken in hand, no matter whether the part *b* or the part *b'* is in operative position, (that is, to the left of the handle,) the inner edge of said part will be beveled from the upper side to the cutting-edge, as shown at *c* in Fig. 1, and the other part (*b'* in Fig. 1) will serve to balance the operative part *b* and prevent the said part *b* from twisting and keep its point from dropping down in use. Of course, if the part *b'* happens to be at the left, then the part *b* will serve as the balancing part, and the beveled edge *c'* on the part *b'* will be uppermost.

In case it is desired to cut the stalks the other way, of course the beveled edges can be cut in the opposite directions—that is, so as to appear on the upper side of the blade when turned to the right; but ordinarily the bevels will be as shown and described.

As it is desirable that the device should be as light as possible at the head end, I prefer to make the double blade perfectly flat its entire length, and to provide the central part, C, thereof with two holes, *d d*, and then, when this part is slipped into the described groove or slot *a* in the end of the handle A, to secure the blade in place by means of two pins or rivets, D D, passing through the holes in the blade and corresponding holes, *d d'*, in the handle.

Of course, I might form the blade with a socket at its center for the handle; but this would increase the cost and weight of the device, and so I prefer the construction shown, though of course I might clip the blade to the handle, or otherwise fasten it, without departing from the spirit of my invention.

Having thus described my invention, what I claim as new, and desire to secure by Letters Patent, is—

1. In a corn-cutter, the combination, with the handle, of a double blade extending on opposite sides of the handle, one part of which is beveled on its cutting-edge at the opposite side from the bevel of the cutting edge of the other part, substantially as set forth.

2. A corn-cutter consisting of a handle and a double curved blade, one half of which is beveled on its cutting-edge on the opposite side from the bevel of the cutting-edge of the other half, the two halves being of equal weight and extending on opposite sides of the handle, whereby when either half of the blade is in use its beveled cutting-edge will be uppermost and its weight will be counterbalanced by the other half of the blade, substantially as set forth.

In testimony that I claim the foregoing I have hereunto set my hand, at Walworth, in the county of Walworth and State of Wisconsin, in the presence of two witnesses.

ROBERT GODFREY.

Witnesses:
 A. S. SPOONER,
 JOHN POWERS.